(12) United States Patent
Pueschner et al.

(10) Patent No.: US 12,543,795 B2
(45) Date of Patent: Feb. 10, 2026

(54) SET OF DEVICES FOR AN ELECTRONIC CIGARETTE, PACKAGING FOR ACCOMMODATING SEVERAL DEVICES FOR AN ELECTRONIC CIGARETTE, BASE ELEMENT FOR AN ELECTRONIC CIGARETTE AND ELECTRONIC CIGARETTE SYSTEM

(71) Applicant: Infineon Technologies AG, Neubiberg (DE)

(72) Inventors: Frank Pueschner, Kelheim (DE); Thomas Lehmann, Sinzing (DE); Jens Pohl, Bernhardswald (DE); Thomas Spoettl, Mintraching (DE); Peter Stampka, Burglengenfeld (DE)

(73) Assignee: Infineon Technologies AG, Neubiberg (DE)

( * ) Notice: Subject to any disclaimer, the term of this patent is extended or adjusted under 35 U.S.C. 154(b) by 713 days.

(21) Appl. No.: 17/574,105

(22) Filed: Jan. 12, 2022

(65) Prior Publication Data

US 2022/0225684 A1 Jul. 21, 2022

(30) Foreign Application Priority Data

Jan. 21, 2021 (DE) .......................... 102021101257.0

(51) Int. Cl.
*A24F 40/53* (2020.01)
*A24D 1/02* (2006.01)
(Continued)

(52) U.S. Cl.
CPC ................ *A24F 40/53* (2020.01); *A24D 1/02* (2013.01); *A24D 1/20* (2020.01); *A24F 40/20* (2020.01);
(Continued)

(58) Field of Classification Search
None
See application file for complete search history.

(56) References Cited

U.S. PATENT DOCUMENTS

2018/0153219 A1   6/2018 Verleur et al.
2018/0271149 A1*  9/2018 Holtz ........................ G06F 1/26

FOREIGN PATENT DOCUMENTS

DE   112017002267 T5   1/2019
DE   102019117231 A1   12/2020
(Continued)

OTHER PUBLICATIONS

German Patent Office, Office Action issued for DE 102021101257.0, 8 pgs., dated Dec. 10, 2021.

*Primary Examiner* — Linda L Gray
(74) *Attorney, Agent, or Firm* — Banner & Witcoff, Ltd.

(57) ABSTRACT

A set of devices is provided for an electronic cigarette. The set of devices has a first device and a second device, wherein the first device has an authentication device which is configured to authenticate the first device and the second device in relation to a control element of the electronic cigarette. The set of devices further has an identifier which indicates that the first device has the authentication device for authenticating the first device and the second device, wherein the second device is without an identifier which indicates that the second device has the authentication device for authenticating the first device and the second device.

12 Claims, 8 Drawing Sheets

(51) Int. Cl.
*A24D 1/20* (2020.01)
*A24F 1/20* (2006.01)
*A24F 40/20* (2020.01)
*B65D 25/00* (2006.01)
*B65D 85/20* (2006.01)

(52) U.S. Cl.
CPC ............. *B65D 25/00* (2013.01); *B65D 85/20* (2013.01); *B65D 2203/00* (2013.01)

(56) References Cited

FOREIGN PATENT DOCUMENTS

| | | | |
|---|---|---|---|
| DE | 102019125943 A1 | 4/2021 | |
| DE | 102019128730 A1 | 4/2021 | |
| WO | WO-2015197165 A1 * | 12/2015 | ............. A24F 40/42 |

* cited by examiner

SET OF DEVICES FOR AN ELECTRONIC CIGARETTE, PACKAGING FOR ACCOMMODATING SEVERAL DEVICES FOR AN ELECTRONIC CIGARETTE, BASE ELEMENT FOR AN ELECTRONIC CIGARETTE AND ELECTRONIC CIGARETTE SYSTEM

TECHNICAL FIELD

The disclosure relates to a set of devices for an electronic cigarette, a packaging for a set of devices for an electronic cigarette, a packaging to accommodate a plurality of devices for an electronic cigarette, a base element of an electronic cigarette, and an electronic cigarette system.

BACKGROUND

With some types of electronic cigarettes, a device having a cigarette-like design and a tobacco element can be accommodated in an accommodation space of a base unit.

The base element can be equipped with a heating element and can be configured to heat the tobacco element under the electronic control of the heating element and thus evaporate substances contained in the tobacco element (tobacco, water, etc.).

It can be desirable for a manufacturer to prevent a use of devices manufactured by third parties with the manufacturer's own base element, for example by requiring an electronic authentication of the device in relation to a control element in the base unit.

However, the problem arises here that the devices are consumables, so that an authentication element is disposed of together with the device after use.

The authentication should therefore be as inexpensive as possible.

A use of low-cost controllers which meet only low security requirements could possibly result in products with falsified authentication elements being introduced onto the market.

If more expensive security controllers are used which meet high security requirements and are disposed of in each case with consumed devices, it seems impossible to enable an attractive pricing.

SUMMARY

In different example aspects, the number of required authentication elements for each packaging with devices (also referred to as "tobacco sticks) for an electronic cigarette is minimized or reduced by a significant amount.

In each case for a set of devices (tobacco sticks), it may suffice according to different example aspects to provide only one single expensive security controller as an authentication element which meets high security requirements and to configure it in such a way that a use of the entire set of devices is authenticated in relation to a control element of an electronic cigarette, said element being configured to control an operation of the electronic cigarette.

In other words, in different aspects, the set of devices can be designed similar to a system consisting of a primary product and a secondary product, in which one of the devices is characterized as the primary product and is equipped with the authentication element. Once a packaging with the set of devices has been opened, the primary product can first be coupled with the base element of the electronic cigarette for authentication, for example it can be inserted into an accommodation space of the base element. In different example aspects, the base element can be equipped with a correspondingly secure read circuit for the authentication.

Following the authentication, in different example aspects, the primary product can be released for use by means of the base element. Furthermore, the additional devices (secondary products) which belong to the set (for example are in the same packaging as the primary product) can be released for use by means of the base element. A packaging can contain, for example, 20 devices. The authentication by means of the primary product can thus on the whole enable a use of 20 devices by means of a single (expensive/high-quality/highly secure) security element. The authentication element can be configured in such a way that it is blocked for further authentications if the total available number of authentications/releases has been transmitted.

In different example aspects, the authentication element can be disposed in a different location within a packaging of the devices, rather than on a primary product device, for example in a lid. In this case, the authentication element can first be coupled with the base element of the electronic cigarette for authentication, for example by placing the base element near to the authentication element or vice versa. In different example aspects, following the authentication, all of the devices in this packaging can be released for use by means of the base element.

Even though the example aspects refer herein to an electronic cigarette in which a fixed tobacco preparation is evaporated, the "primary product/secondary product principle", i.e. the authentication of a complete set of low-cost consumables by means of a single authentication element can also be applied in different example aspects to different types of electronic cigarettes such as, for example, those which evaporate a liquid, or even to other consumables also which are sold in sets.

BRIEF DESCRIPTION OF THE DRAWINGS

Example aspects of the disclosure are shown in the figures and are explained in detail below.

In the drawings.

DETAILED DESCRIPTION

In the following detailed description, reference is made to the attached drawings which form part thereof and in which specific aspects in which the disclosure can be implemented are shown by way of illustration. In this respect, direction terminology, such as "above", "below", "in front", "behind", "front", "rear", etc., is used in relation to the orientation of the described figure(s). Since components of example aspects can be positioned in a number of different orientations, the direction terminology serves for illustration and is in no way limiting. Other aspects can obviously be used and structural or logical modifications can be made without departing the protective scope of the present disclosure. The features of the different example aspects described herein can be combined with one another, unless specifically indicated otherwise. The following detailed description is therefore not to be interpreted in a limiting sense, and the protective scope of the present disclosure is defined by the attached claims.

In the context of this description, the terms "linked", "connected" and "coupled" are used to describe both a direct and an indirect link, a direct or indirect connection, and a direct or indirect coupling. Identical or similar elements are denoted with identical reference numbers in the figures, insofar as this is appropriate.

In the case of a non-electronic authentication method for devices for an electronic cigarette, a barcode/QR code can be located e.g. in the lid of a packaging of the devices for authentication and can be read e.g. with the camera of a cell phone, and either functions immediately or, as in the case e.g. of a prepaid card for payment services, is synchronized with a server. This verified authorization can then be transmitted, for example, from the cell phone by means of NFC onto the base device 332.

In different example aspects, a set of devices is provided for an electronic cigarette.

The electronic cigarette described herein typically has a tobacco element which has a (fixed) tobacco preparation. The tobacco preparation can be heated by means of a base element of the electronic cigarette, for example to around 350° C., in order to form tobacco-enriched aerosols.

Further elements (e.g. cooling element, filter element, wrapping element) can perform additional functions, for example cooling the aerosol, filtering the aerosol, creating a "cigarette" feel for the user, etc. The wrapping element can comprise, for example, paper and/or plastic. The authentication device 109 is typically concealed under the wrapping element (and is shown accordingly by broken lines in the figures).

Figure 1A:
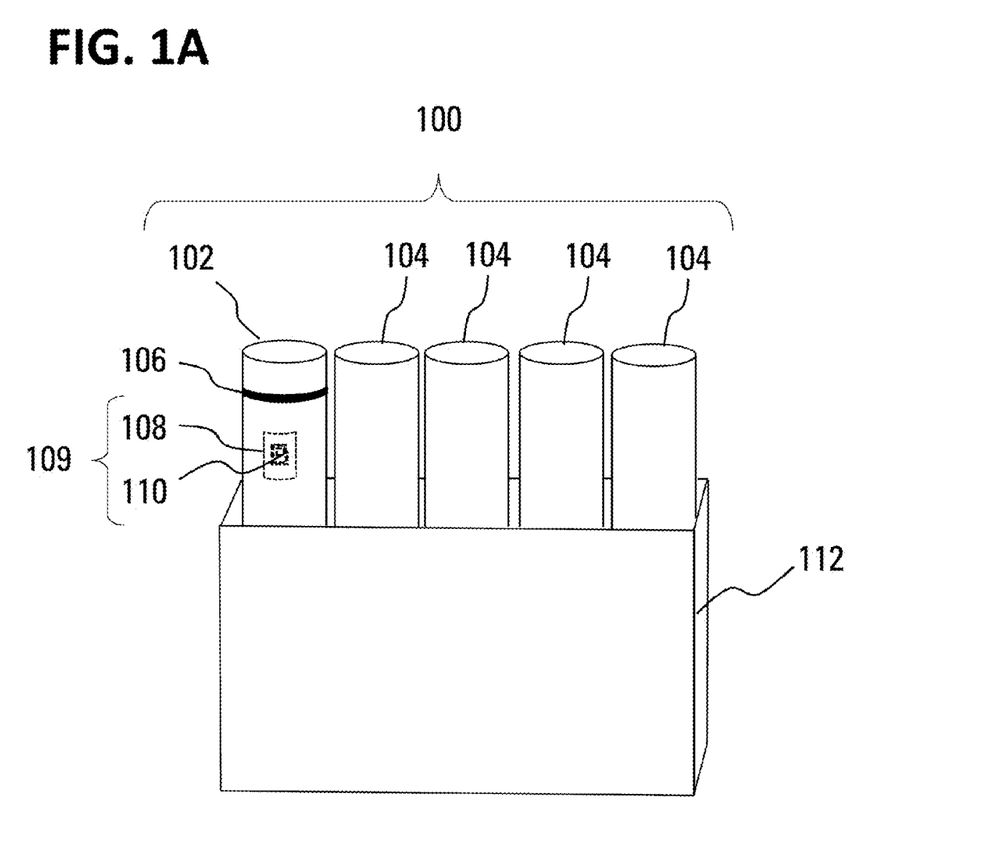
FIGS. 1A to 1E in each case show a schematic view of a set of devices for an electronic cigarette according to different example aspects.
Figure 1B:
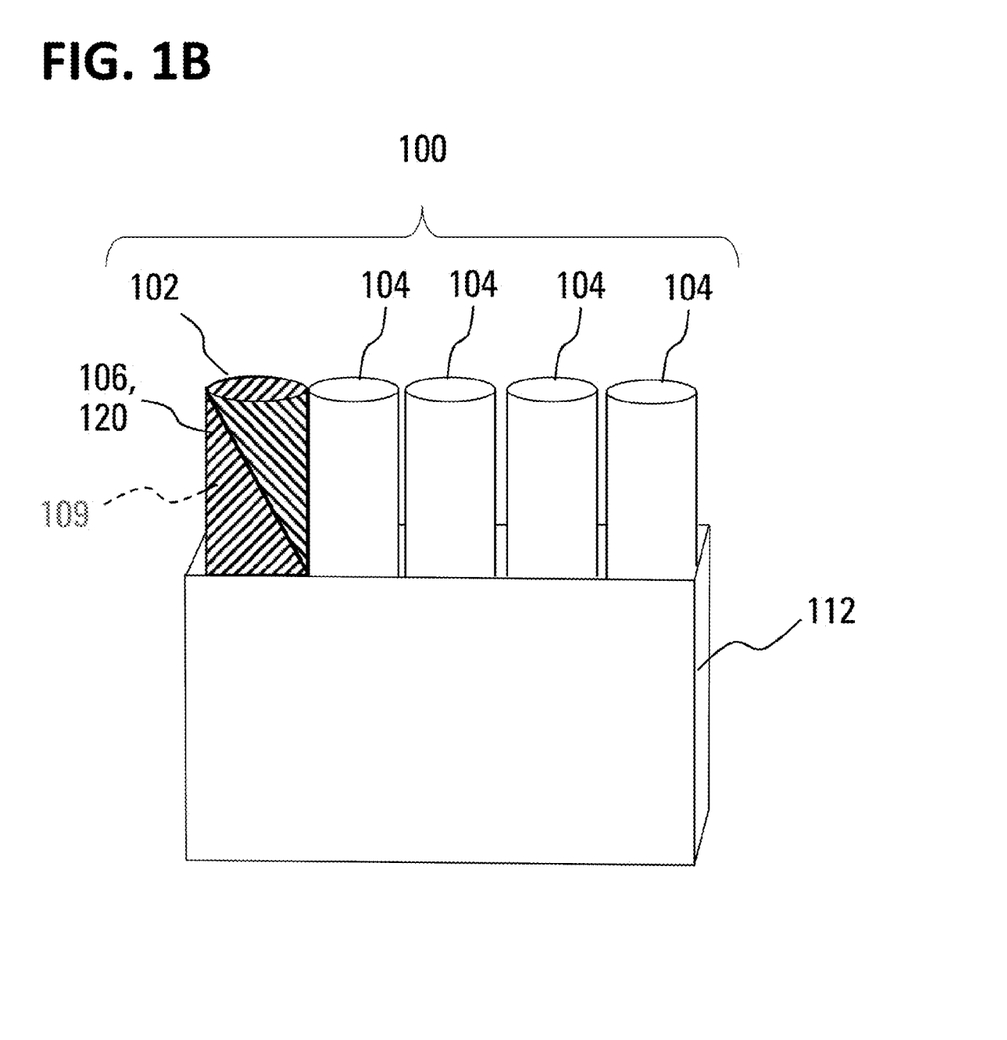
Figure 1C:
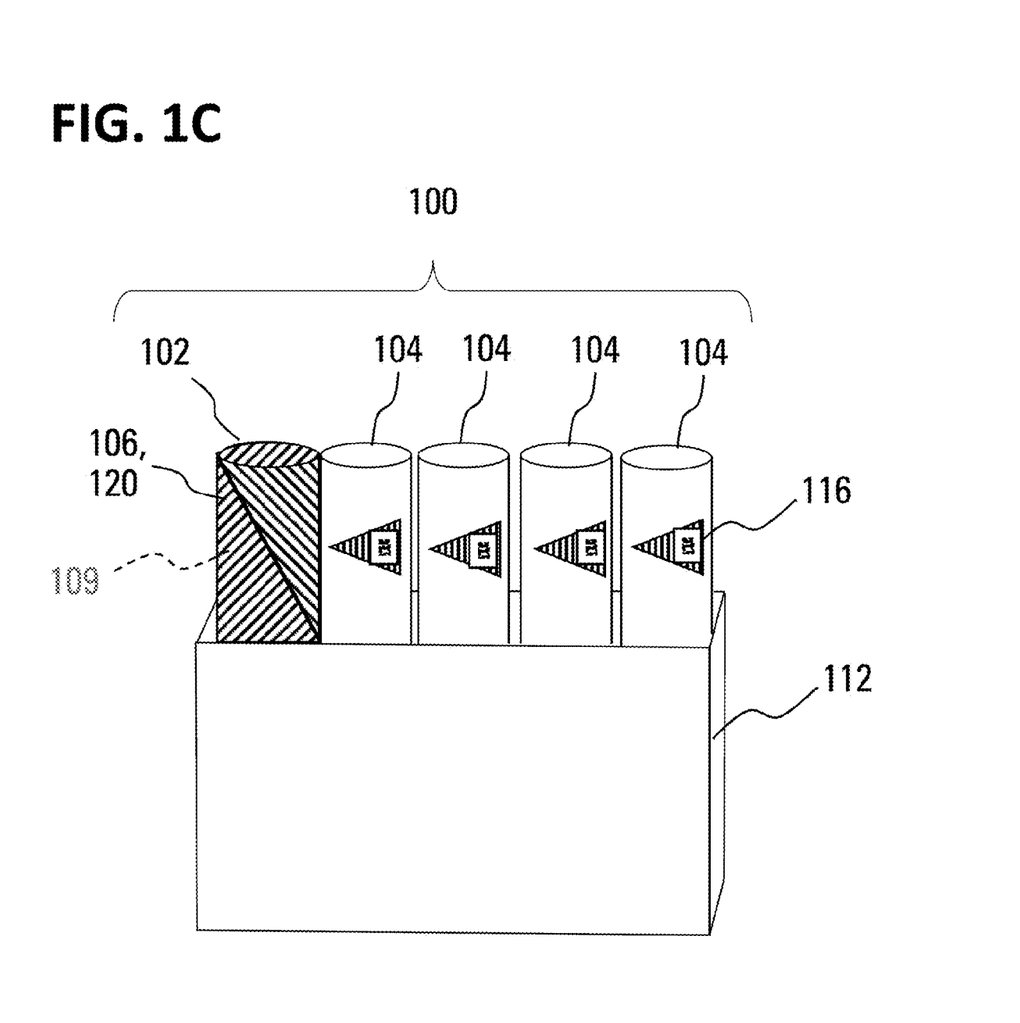
Figure 1D:
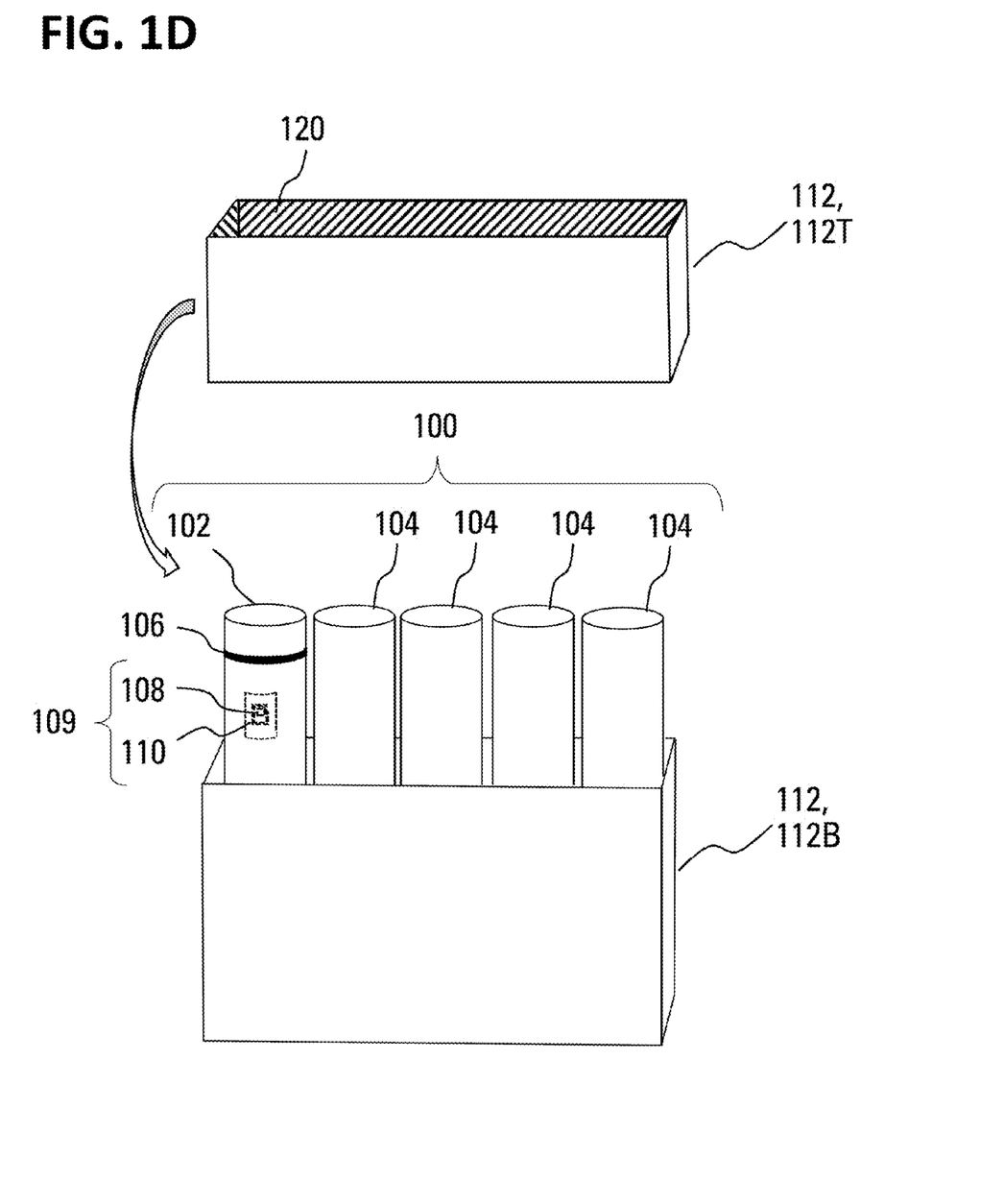
Figure 1E:
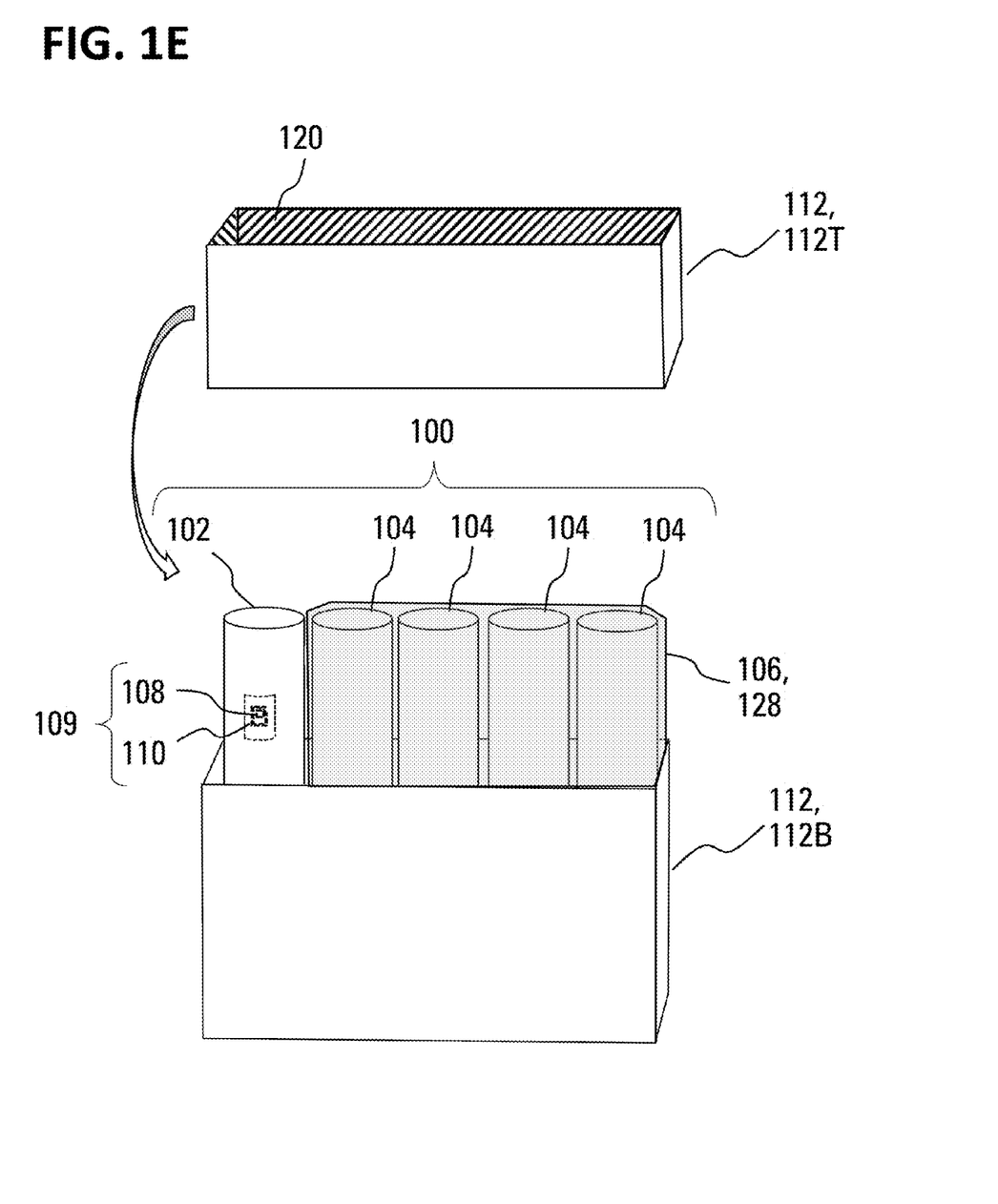
Figure 2:
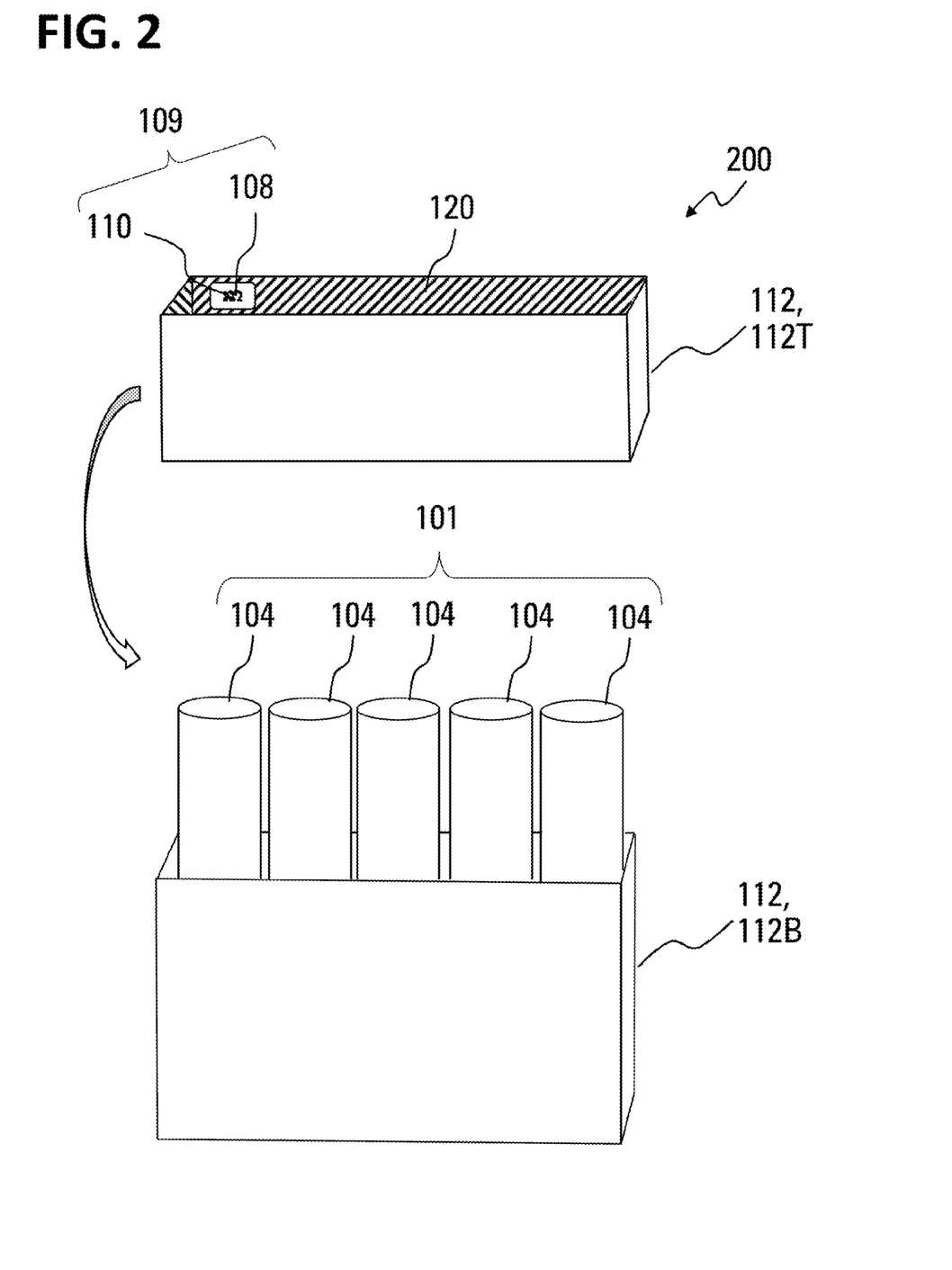
FIG. 2 shows a schematic view of a packaging to accommodate a plurality of devices for an electronic cigarette according to different example aspects.
Figure 3A:
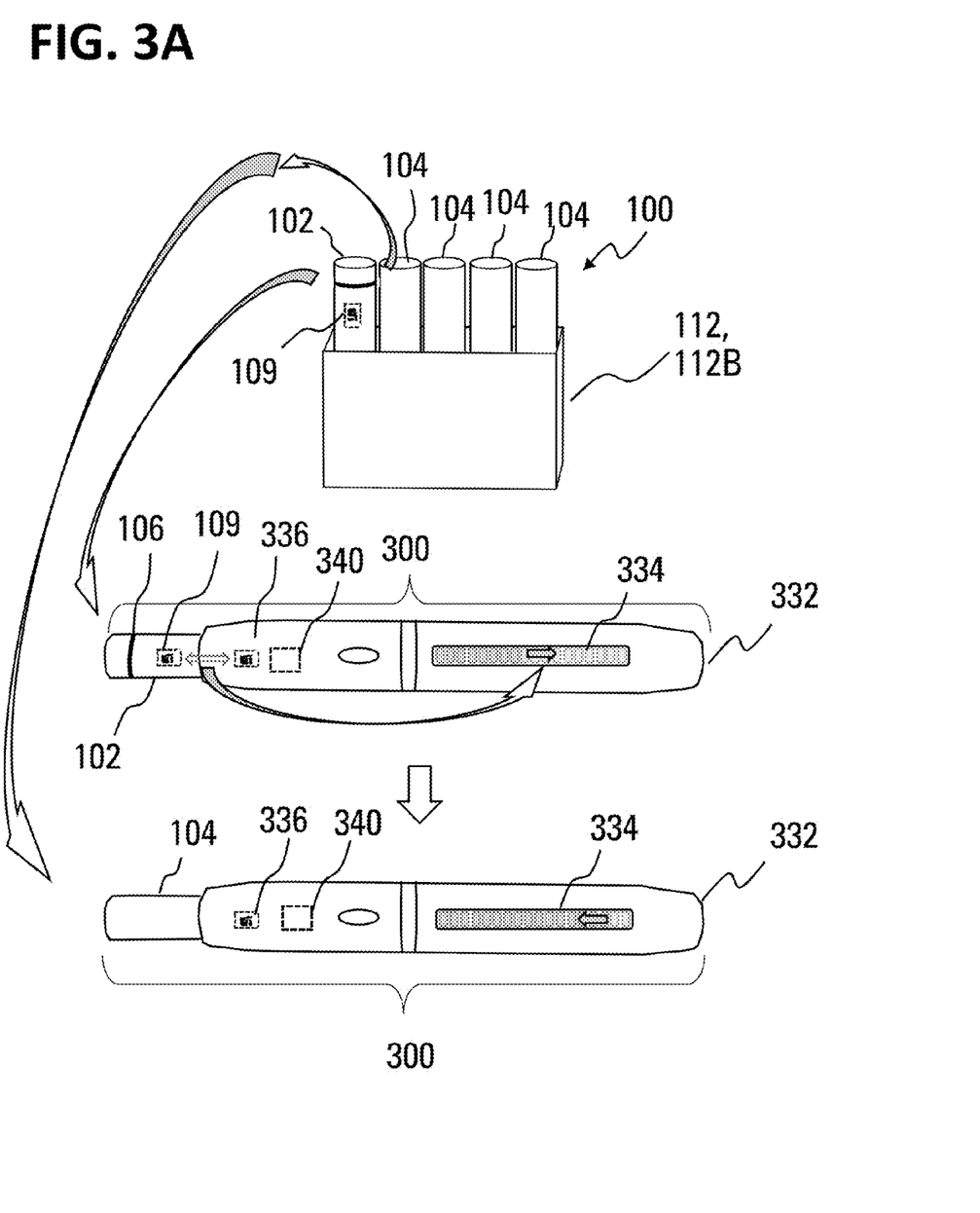
FIG. 3A illustrates a use of a set of devices for an electronic cigarette according to different example aspects, having a base element of an electronic cigarette according to different example aspects which together form an electronic cigarette system.
Figure 3B:
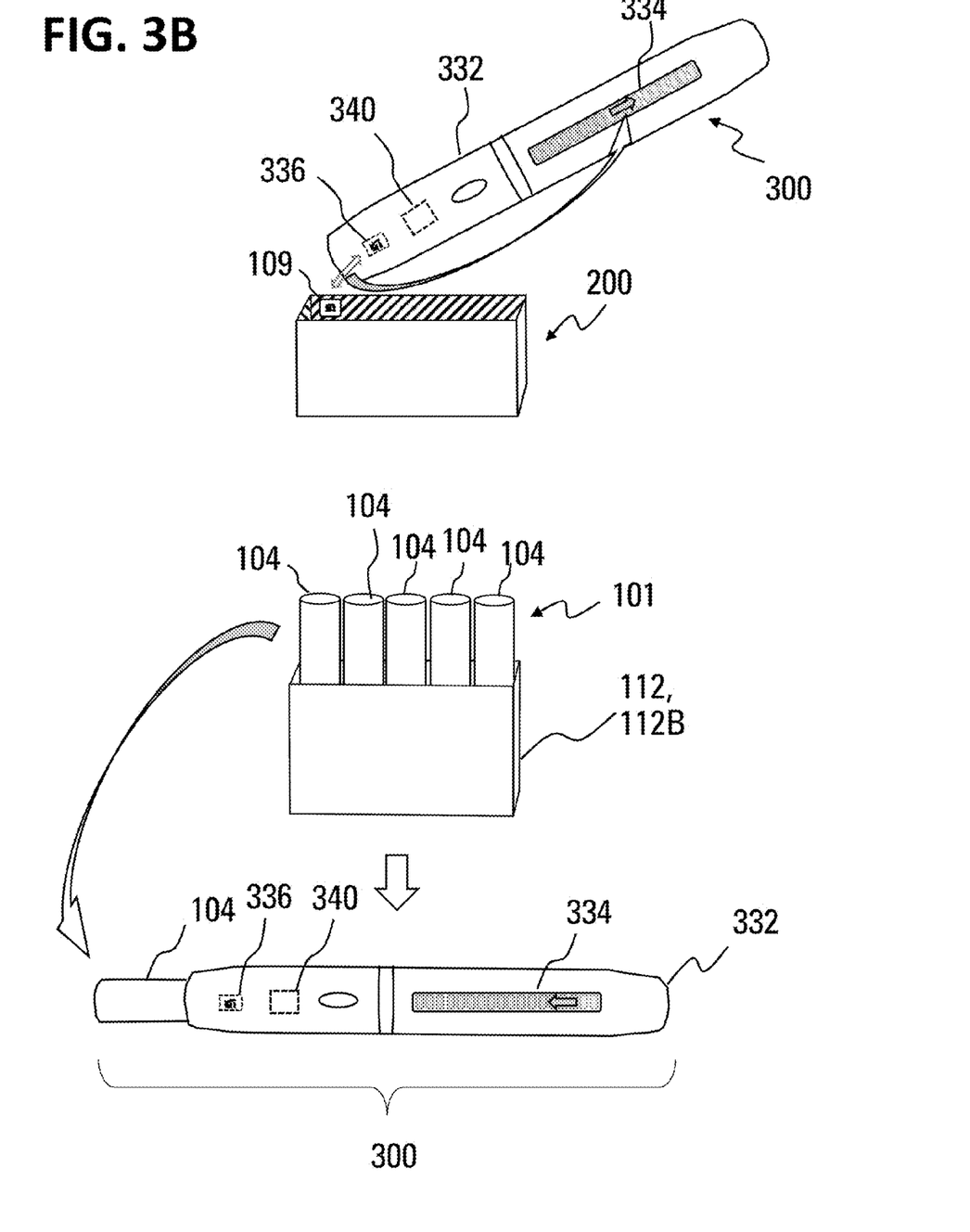
FIG. 3B illustrates a use of a packaging to accommodate a plurality of devices for an electronic cigarette according to different example aspects, having a base element of an electronic cigarette according to different example aspects which together form an electronic cigarette system.

FIG. 1A to 1E in each case show a schematic view of a set 100 of devices 102, 104 for an electronic cigarette according to different example aspects, FIG. 2 shows a schematic view of a packaging to accommodate a plurality of devices for an electronic cigarette according to different example aspects, FIG. 3A illustrates a use of a set of devices for an electronic cigarette according to different example aspects, having a base element of an electronic cigarette according to different example aspects which together form an electronic cigarette system, and FIG. 3B illustrates a use of a packaging to accommodate a plurality of devices for an electronic cigarette according to different example aspects, having a base element of an electronic cigarette according to different example aspects which together form an electronic cigarette system.

Each of FIG. 1A to 3B shows a set 100 or 101 of devices 102, 104 for an electronic cigarette 300. A set 100, 101 of devices 102, 104 (e.g. tobacco sticks or pods with a liquid to be evaporated) is understood herein to mean a plurality of devices 102, 104 which form a combined unit, for example are sold in a common closed packaging 112, and are provided for a single or consecutive use.

In different example aspects, the set 100 can comprise a first device 102 and a second device 104 or a plurality of second devices 104 (four second devices are shown by way of example in FIG. 1A, although each packaging 112 normally contains, for example, around twenty devices 102, 104).

The first device 102 can have an authentication device 109 which can be configured to authenticate the first device 102 and additionally the second device 104 (or the plurality of second devices 104) also in relation to a control element 340 of the electronic cigarette 300.

The authentication device 109 can comprise an authentication logic 110, e.g. a security controller, and an antenna 108. The authentication logic 110 can be based, for example, on an essentially known security controller for higher security requirements which can be configured to perform the authentication functions described herein.

The antenna 108 can be coupled with the authentication logic 110, e.g. the security controller, and possibly with a communication circuit (not shown).

In different example aspects, communication between the authentication logic 110 and a read circuit 336 which can form part of the base element 332 can take place according to a protocol for near-field communication (NFC) or other suitable wireless data transmission method.

In different example aspects, the read circuit 336 of the base element 332 can be configured to enable an authentication of the device 102, 104 in relation to the control element 340 and a use of the device 102, 104 by means of the base element 332 (for example controlled by the control element 340). The read circuit 336 can have an electrically conducting connection to a read antenna in order to receive the authentication information received by the read antenna, or by means of a different circuit (for example by means of the control element 340 which can be formed, for example, as a control circuit) and accordingly enable the use of the e-cigarette 300 (e.g. heat up the tobacco element) or bar said use.

The first device 102 can comprise an identifier 106 which indicates that the first device 106 comprises the authentication device 109 for authenticating the first device 102 and the second device 104.

The identifier 106 can be designed in essentially any manner, as long as it is ensured that, once a packaging 112 has been opened, it is immediately recognizable (e.g. it is visually or haptically perceptible) for a user which of the devices 102, 104 is the first device 102 by means of which he has to perform the authentication of all devices 102, 104 of the set 100 of devices 102, 104 which the packaging 112 contains.

By way of example, a ring is imprinted, created or attached as an identifier 106 in FIGS. 1A, 1D and 3A. Any other appropriate design elements can be used as the identifier 106, for example a use of a wrapping element colored differently than in the second devices 104, an imprint, a slightly larger or smaller length of the first device 102 compared with the second devices 104, etc.

In different example aspects (illustrated in FIG. 1B), the first device 102 can be wrapped, wherein the wrapping serves as the identifier 106. If necessary, the wrapping can simultaneously serve as a shield in order to prevent the performance of an authentication when the packaging 112 is closed, for example by a passerby in a store.

A shield of this type can be used, if necessary, in each of the example aspects described herein (in FIG. 1D, FIG. 1E and FIG. 2, the shield 120 is integrated into the lid 112T of the packaging 112). The shield can be formed, for example, from aluminum foil or as an aluminum coating of the packaging 112, or in a different essentially known manner.

FIG. 3A illustrates how the set 100 of devices 102, 104 can be used according to different example aspects.

Once the packaging 112 with the set 100 of devices 102, 104 has been opened, the first device 102 (the primary product) which can be identifiable on the basis of its identification 106 (here: a ring), can be coupled with the base element 332 of the electronic cigarette 300 for authentication, for example can be inserted into an accommodation space of the base element 332. In different example aspects, the base element 332 can be equipped for the authentication with a correspondingly secure read circuit 336 which uses, for example, a trusted platform module (TPM) in order to prevent fraud, e.g. by means of hardware exchange, manipulation of the read circuit 336, etc.

Following the authentication, the first device 102 (the primary product) can be released for use by means of the base element 332 (e.g. in order to evaporate the tobacco element).

In addition, the second devices 104 (secondary products) which belong to the set 100 (for example are in the same packaging 112 as the primary product) can be released for use by means of the base element 332.

Once the first device 102 is consumed, it can be removed from the base element 332 and can be replaced if required by one of the second devices 104 without a further authentication having to be performed.

In different example aspects, the authentication logic 110 of the primary product 102 can be configured in such a way that it is blocked for further authentications if the total available number of authentications/releases has been transmitted to the read circuit 336 of the base element 332.

The authentication logic 110 can contain, for example, a counter (or something comparable) which blocks the authentication logic 110 or sets it to "zero" as soon as all authorizations have been transmitted onto the base element 332. A further transmission of the same authorizations onto different base elements 332 can thus be prevented.

In different example aspects, the total number of authorizations/authentications can be transmitted onto the base element 332 in a single transmission procedure.

In different example aspects, the base element 332 can be equipped with an operating function which, from the available authorizations/authentications (e.g. n=1 to n=maximum number, e.g. 20), enables only a defined part (e.g. 1≤m<n) to be transmitted from the authentication element 109 onto the base element 332. Buttons can be provided, for example, to set a number m to be transmitted, and/or an indicator 334 (see FIGS. 3A and 3B) can indicate a transmission procedure which is interruptible (e.g. by pressing a button) at a desired time, i.e. on reaching the desired number. If necessary, an additional indicator can be provided which indicates the authorizations/authentications which are still available in the primary product 102.

This can enable the authorizations to be divided between different base elements 332 and, for example for a "cigarette to be offered" to someone who possesses a further base device 332, or a set 100, 101 of devices 102, 104 to be divided between e.g. two users who in each case possess a base element 332.

In this configuration, some of the authorizations can remain stored on the authentication logic 110.

In different example aspects, the identifier 106 can form part of the packaging 112, for example in that a protective sleeve 128 is designed in such a way that, once the packaging 112 has been opened, it first releases the first device 102 (this is shown in FIG. 1E), and releases the second devices 104 only after the protective sleeve 128 has been removed, or, for example, in that the packaging 112 is equipped with a lifting device which lifts the first device 102 slightly on opening so that it stands out the second devices 104, or, for example, by means of an imprint on an inner and/or outer side of the packaging which marks the first device 102.

The second device 104 can be without an identifier 106 of this type, i.e. without an identifier 106 which would indicate that the second device 104 has the authentication device 109 for authenticating the first device 102 and the second device 104.

In different example aspects, the second device 104 can have a device identifier 106 which indicates that the second device 104 is assigned to the first device 102.

In different example aspects, the device identifier 116 can have, for example, a visually and or haptically detectable marker (in FIG. 1C this is shown, by way of example, as a shaded triangle), and/or has an electronic marker (shown in FIG. 1C as a wireless chip module). In different example aspects, the electronic marker can have a circuit which meets significantly lower security requirements than the authentication logic 110 and is accordingly significantly less costly. The electronic marker can be designed, for example, to assign the second device 104 to the first device by means of an electronic identifier or the like.

In different example aspects, the authentication device 109 can be disposed inside the packaging 112 without being part of a primary product device 102. The authentication device 109 can be disposed, for example, on an inner side of a lid 112T of the packaging 112, or, for example, on a separately removable authentication element in a base part 112B of the packaging 112, or the like.

In other words, in different example aspects, a packaging 112 can be provided to accommodate a plurality of devices 104 (a set 101) for an electronic cigarette 300. The packaging 112 can have an authentication device 109 which can be configured to authenticate the devices 104 accommodated in the packaging 112 in relation to a control element 340 of the electronic cigarette 300 which can be configured to control an operation of the electronic cigarette. The devices 104 can correspond here to what is designated in the example aspects from FIG. 1A bis 1E as the second device 104, i.e. the secondary product devices without their own authentication function.

Apart from the type or position of the authentication device 109, the principle of common authentication corresponds to what was explained above in connection with the example aspects from FIG. 1A to 1E, so that no repeat explanation is required.

FIG. 3B illustrates how the set 101 of devices 104 can be used according to different example aspects.

Once the packaging 112 with the set 101 of devices 104 has been opened, the authentication device 109 can be coupled with the base element 332 of the electronic cigarette 300 for authentication, for example by moving the base element 332 with its read circuit 336 close to the authentication device 109.

Following the authentication, the devices 104 can be released for use by means of the base element 332 (e.g. in order to evaporate the tobacco element).

Once the first of the devices 104 has been consumed, it can be removed from the base element 332 and can be replaced if required by a further of the devices 104 without a new authentication having to be performed.

The provision of the authentication device 109 independently from the primary device 102 can be advantageous in cases where, as described above, only some of the authentications/authorizations are transmitted onto a first base element 332, and further of the available authentications/authorizations are intended to be transmitted to at least one further base element. It could in fact otherwise be necessary to continue to carry the primary element 102 in order to provide the remaining authorizations/authentications, even though it is possibly already consumed.

The set 101 of devices 104 is referred to as the set 101 in order to distinguish it from the set 100 which has the first device 102 and the second device 104.

A combination of the set 100 of devices 102, 104 with a base element 332 of an electronic cigarette 300 can be referred to as an electronic cigarette system.

A combination of the set 101 of devices 104 with a base element 332 of an electronic cigarette 300 can be referred to as an electronic cigarette system.

In different example aspects, in addition to the read circuit 336 and the accommodation space for the devices 102, 104, the base element 332 can have additional operating elements, such as, for example, a circuit to control the heating function of the heating element for evaporating the tobacco element, an energy supply (e.g. a battery), a lamp to indicate operational readiness and/or a battery state an ON/OFF switch, etc.

In different example aspects, the base element 332 can be configured to start a counter with the authentication (for example in the read circuit 336, in the circuit for controlling the heating function or possibly in a further circuit) which ends with a consumption of the last device 104 of the set of devices 100 or 101.

The counter can be configured to count the number of consecutive devices 102, 104 used by means of the base element 332 up to the number of devices 102, 104 belonging to the set 100 or 101, and/or a time duration which is required to consume the devices 102, 104 belonging to the set 100 or 101.

In different example aspects, the base element 332 can have an indicator 334 in order to simplify the operation of the multiple release according to different example aspects. The indicator 334 (e.g. a display or a plurality of LEDs) can be configured, for example, in such a way that it indicates a current reading of the counter.

In FIGS. 3A and 3B, arrows are used to illustrate that the indicator 334 is "charged" when the authentication device 109 is coupled with the base element 332, corresponding to a setting of the counter to a maximum value (maximum number or maximum usage duration) predefined by means of the authentication device 109, and is partially "discharged" with a changeover from the primary product device 102 to one of the secondary product devices 104.

Not only is a state of charge thus communicated, but the successful coupling of the authentication device 109 with the base element 332 is additionally indicated.

In different example aspects, information relating to the coupling state and/or usage state (state of charge) can be communicated in a different manner detectable by the user, for example by means of a vibration, an audible notification, etc.

To summarize, some example aspects are indicated below.

Example embodiment 1 is a set of devices, designed to be accommodated in a base element of an electronic cigarette. The set has a first device and a second device, wherein the first device has an authentication device which is configured to authenticate the first device and the second device in relation to a control element of the electronic cigarette. The set of devices further has identifier which indicates that the first device has the authentication device for authenticating the first device and the second device, wherein the second device is without an identifier which indicates that the second device has the authentication device for authenticating the first device and the second device.

Example embodiment 2 is a set of devices according to example embodiment 1, wherein the second device has a device identifier which indicates that the second device is assigned to the first device.

Example embodiment 3 is a set of devices according to example embodiment 1 or 2, wherein the authentication device is configured for near-field communication with the base element.

Example embodiment 4 is a set of devices according to example embodiment 2 or 3, wherein the device identifier has a visually and or haptically detectable marker and/or an electronic marker.

Example embodiment 5 is a set of devices according to example aspects 1 to 4, wherein the identifier is part of the first device.

Example embodiment 6 is a set of devices according to example aspects 1 to 5, wherein the identifier is a visually and or haptically detectable marker on the first device.

Example embodiment 7 is a packaging with the set of devices according to one of example aspects 1 to 6.

Example embodiment 8 is a packaging with the set of devices according to one of example aspects 1 to 4, wherein the identifier is part of the packaging and the first device stands out from the second device by means of a marking, position and/or accessibility.

Example embodiment 9 is a packaging to accommodate a plurality of devices for an electronic cigarette. The packaging has an authentication device which is configured to authenticate the devices accommodated in the packaging in relation to a control element of the electronic cigarette.

Example embodiment 10 is a packaging according to example embodiment 8 or 9, which further has a shield which is configured to enable the authentication only after the packaging has been opened.

Example embodiment 11 is a base element for an electronic cigarette. The base element has a read circuit which is configured to enable an authentication of the first device of the set of devices according to one of example aspects 1 to 6 and/or an authentication of the plurality of devices from a packaging according to example embodiment 9 or 10, and use of the devices.

Example embodiment 12 is a base element according to example embodiment 11, wherein the read circuit is further configured to start a counter with the authentication, said counter ending with a consumption of the last of the devices.

Example embodiment 13 is a base element according to example embodiment 12, wherein the counter is configured to count the number of consecutive devices used by means of the base element up to the number of devices belonging to the set, and/or a time duration which is required to consume the devices belonging to the set.

Example embodiment 14 is a base element according to example embodiment 12 or 13, which further has an indicator which is configured to indicate the current reading of the counter.

Example embodiment 15 is an electronic cigarette which has a device and a base element according to one of example aspects 11 to 14.

Example embodiment 16 is an electronic cigarette system. The electronic cigarette system has a set of devices according to one of example aspects 1 to 7, or a packaging according to one of example aspects 8 to 10, and a base element according to one of example aspects 11 to 14 with an accommodation space in each case to accommodate one of the devices.

Further advantageous designs of the device are set out in the description of the method and vice versa.

The invention claimed is:

1. A set of devices designed to be accommodated in a base element of an electronic cigarette, the set of devices comprising:
a first device;
a second device;
wherein the first device has formed therein an authentication device comprising authentication logic configured to authenticate the first device and the second device in relation to a control element which is disposed in the base element; and
an authentication device identifier formed as a visually and/or haptically detectable marker on an exterior surface of the first device, and configured to indicate that the first device comprises the authentication device configured to authenticate the first device and the second device,
wherein the second device is without any authentication device identifier.

2. The set of devices as claimed in claim 1,
wherein the second device is assigned to the first device.

3. The set of devices as claimed in claim 1,
wherein the authentication device is configured for near-field communication with the base element.

4. The set of devices as claimed in claim 2,
wherein an assignment identifier of the second device has a visually and/or haptically detectable marker and/or an electronic marker.

5. A packaging comprising the set of devices as claimed in claim 1.

6. The packaging as claimed in claim 5,
wherein the authentication device identifier of the first device is part of the packaging and the first device stands out from the second device by means of a marking, position and/or accessibility.

7. A base element of an electronic cigarette, comprising: a read circuit configured to perform an authentication of the first device of the set of devices as claimed in claim 1.

8. The base element as claimed in claim 7, wherein the read circuit is further configured to start a counter with the authentication, the counter ending with a consumption of the last of the devices.

9. The base element as claimed in claim 8, wherein the counter is configured to count the number of consecutive devices used by means of the base element up to the number of devices belonging to the set, and/or a time duration which is required to consume the devices belonging to the set.

10. The base element as claimed in claim 8, further comprising: an indicator configured to indicate a current reading of the counter.

11. An electronic cigarette, comprising: a device; and a base element as claimed in claim 7.

12. An electronic cigarette system, comprising:
a set of devices as claimed in claim 1; and
a base element of an electronic cigarette, comprising:
a read circuit configured to perform an authentication of the first device of the set of devices, and to enable a use of the devices; and
an accommodation space to accommodate each of the devices.

* * * * *